United States Patent
Heikkila et al.

(10) Patent No.: US 7,769,117 B2
(45) Date of Patent: Aug. 3, 2010

(54) DETERMINATION OF A NOISE COVARIANCE MATRIX FOR A WIRELESS COMMUNICATION CHANNEL

(75) Inventors: Markku J. Heikkila, Oulu (FI); Kari Majonen, Hankipudus (FI)

(73) Assignee: Nokia Corporation, Espoo (FI)

( * ) Notice: Subject to any disclaimer, the term of this patent is extended or adjusted under 35 U.S.C. 154(b) by 810 days.

(21) Appl. No.: 11/724,235

(22) Filed: Mar. 15, 2007

(65) Prior Publication Data
US 2008/0014876 A1 Jan. 17, 2008

(30) Foreign Application Priority Data
Apr. 4, 2006 (FI) .................................. 20065220

(51) Int. Cl.
H04B 1/10 (2006.01)
H04L 1/02 (2006.01)

(52) U.S. Cl. ...................... 375/346; 375/350; 455/296

(58) Field of Classification Search ............. 455/67.11, 455/296, 303, 304, 305, 226.1; 375/346, 375/348, 350
See application file for complete search history.

(56) References Cited

U.S. PATENT DOCUMENTS

| | | | |
|---|---|---|---|
| 6,141,393 A * | 10/2000 | Thomas et al. | 375/347 |
| 7,039,001 B2 * | 5/2006 | Krishnan et al. | 370/203 |
| 7,463,576 B2 * | 12/2008 | Krishnan et al. | 370/203 |
| 2002/0131537 A1 | 9/2002 | Storm et al. | |
| 2003/0035491 A1 * | 2/2003 | Walton et al. | 375/267 |
| 2004/0203397 A1 | 10/2004 | Yoon et al. | |

FOREIGN PATENT DOCUMENTS

EP 1 530 333 A1 5/2005

OTHER PUBLICATIONS

International Search Report PCT/FI2007/050186 filed Apr. 3, 2007.

* cited by examiner

*Primary Examiner*—Blane J Jackson
(74) *Attorney, Agent, or Firm*—Squire, Sanders & Dempsey L.L.P.

(57) ABSTRACT

A receiving method and a receiver of a telecommunication system are provided. The receiver comprises one or more antennas, a radio frequency unit connected to the antennas for receiving signals transmitted by one or more transmitters using a multitude of channels, and an estimator. The estimator is configured to select one or more channel pairs, each channel of each channel pair being a given distance from each other, determine symbol estimates for the signals of the channels of the channel pairs, remove the effect of data modulation from the signals of the channels of the channel pairs, obtain noise estimates by subtracting the signals of the channels of the channel pairs from each other, and determine a noise covariance matrix for the desired channel on the basis of the obtained noise estimates.

24 Claims, 2 Drawing Sheets

DETERMINATION OF A NOISE COVARIANCE MATRIX FOR A WIRELESS COMMUNICATION CHANNEL

FIELD

Figure 1:
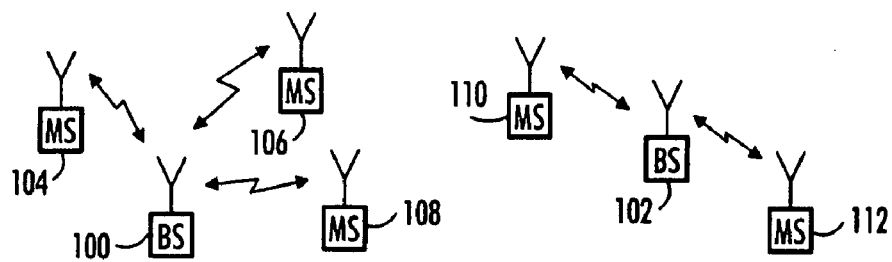

The invention relates to a receiver and a receiving method, where signals transmitted by one or more transmitters using a multitude of channels are received by a receiver and where a signal covariance matrix is calculated in the receiver.

BACKGROUND

In wireless telecommunication systems, the design of data transmission is a challenging task. The data transmission may be impaired by several factors, such as fast and slow fading, multipath propagation, interference from other systems and interference from other users within the same system.

In general, to transmit signals of a multitude of users simultaneously, several channels are needed. In systems offering large bandwidth to users several channels may be offered to a single user. The channels may be realized with frequencies (frequency division multiple access), time slots (time division multiple access), codes (code division multiple access) and different combinations of the above. One example of an access method studied lately is orthogonal frequency-division multiple access, OFDMA.

Several receiver algorithms have been designed to wireless telecommunication systems. The receiver must be able to capture and demodulate the transmitted signal as efficiently as possible. Maximum Ratio Combining (MRC), Maximum Likelihood receiver and Maximum A Posteriori Receiver (MAP) are examples of known receiver algorithms.

For environments where interference is present, interference suppression methods have been developed. An example of such a method is Interference Rejection Combiner, which is an efficient method in applications where multiple antennas are utilized in receivers.

In all algorithms and methods mentioned above, the calculation of a signal covariance matrix is required. Covariance matrix can be formed or estimated using various methods. In some cases covariance matrix is calculated using input samples of the received signal. In other cases, a noise covariance matrix is calculated. The first method does not produce so reliable results as the calculation of noise covariance matrix. However, present methods of determining a noise covariance matrix rely on channel estimates. Thus, channel transfer functions must be calculated prior to the determination of the noise covariance matrix. This causes additional delay as the calculation of channel transfer functions is a time consuming process.

BRIEF DESCRIPTION OF THE INVENTION

An object of the invention is to provide an improved solution for receiving a signal, where channel estimates are not needed when determining a noise covariance matrix. According to an aspect of the invention, there is provided a method of receiving a signal in a telecommunication system, the method comprising: receiving with one or more antennas signals transmitted by one or more transmitters using a multitude of channels, selecting one or more channel pairs, each channel of each channel pair being a given distance from each other, determining symbol estimates for the signals of the channels of the channel pairs, removing the effect of data modulation from the signals of the channels of the channel pairs, obtaining noise estimates by subtracting the signals of the channels of the channel pairs from each other, and determining a noise covariance matrix for the desired channel on the basis of the obtained noise estimates.

According to another aspect of the invention, there is provided a receiver of a telecommunication system, comprising: one or more antennas, a radio frequency unit connected to the antennas for receiving signals transmitted by one or more transmitters using a multitude of channels, an estimator configured to select one or more channel pairs, each channel of each channel pair being a given distance from each other, determine symbol estimates for the signals of the channels of the channel pairs, remove the effect of data modulation from the signals of the channels of the channel pairs, obtain noise estimates by subtracting the signals of the channels of the channel pairs from each other, and determine a noise covariance matrix for the desired channel on the basis of the obtained noise estimates.

According to another aspect of the invention, there is provided a receiver of a telecommunication system, comprising: one or more antennas, means for receiving signals transmitted by one or more transmitters using a multitude of channels, means for selecting one or more channel pairs, each channel of each channel pair being a given distance from each other, means for determining symbol estimates for the signals of the channels of the channel pairs, means for removing the effect of data modulation from the signals of the channels of the channel pairs, means for obtaining noise estimates by subtracting the signals of the channels of the channel pairs from each other, and means for determining a noise covariance matrix for the desired channel on the basis of the obtained noise estimates.

According to yet another aspect of the invention, there is provided a computer program distribution medium readable by a computer and encoding a computer program of instructions for executing a computer process for receiving signals with one or more antennas, the signals having been transmitted by one or more transmitters using a multitude of channels, the process comprising: selecting from a signal one or more channel pairs, each channel of each channel pair being a given distance from each other, determining symbol estimates for the signals of the channels of the channel pairs, removing the effect of data modulation from the signals of the channels of the channel pairs, obtaining noise estimates by subtracting the signals of the channels of the channel pairs from each other, and determining a noise covariance matrix for the desired channel on the basis of the obtained noise estimates.

The invention provides several advantages. The presented solution provides a fast calculation of the covariance matrix and it does not require knowledge about the channel estimates. Thus, possible channel estimation errors have no effect on the estimates of the desired covariance matrix. The calculated covariance matrix may efficiently be used in data demodulation and interference cancellation.

In an embodiment of the invention, the solution is applied to an OFDMA system. When a covariance matrix for a given subcarrier is estimated, signals of two or more nearby subcarriers are subtracted from each other after removing the effect of different data modulation in the subcarriers. Subtraction cancels the desired signal component and only noise remains. In an embodiment, subcarriers comprising a pilot channel are utilized in the estimation. In such a nearest case subcarriers carrying a pilot signal are used in the subtraction. An average value of several subtractions may be taken to reduce estimation error.

LIST OF DRAWINGS

Figure 2:
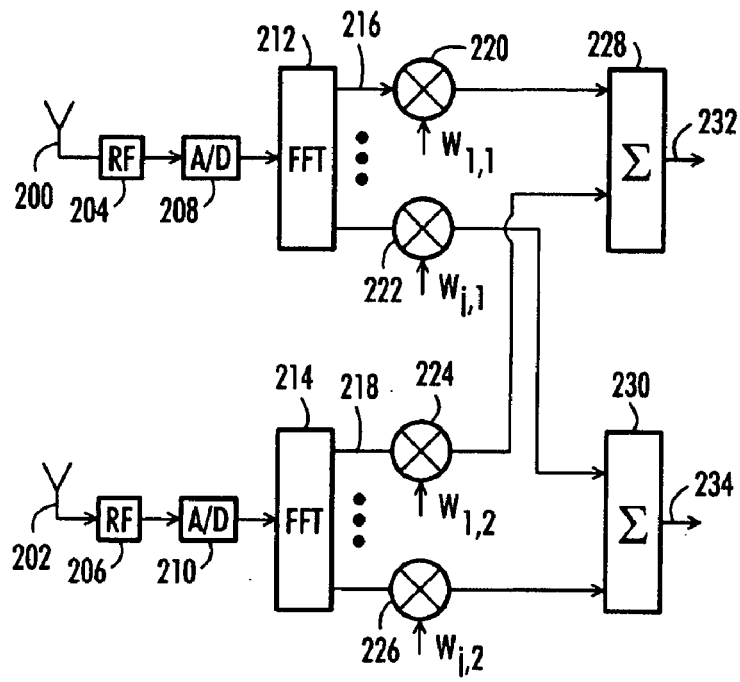
Figure 3:
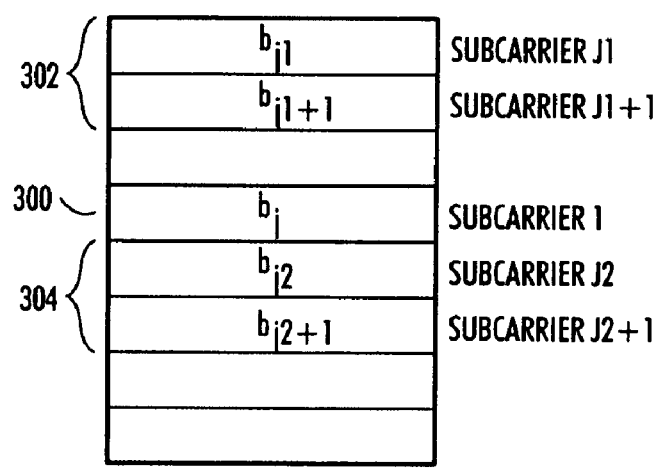
Figure 4:
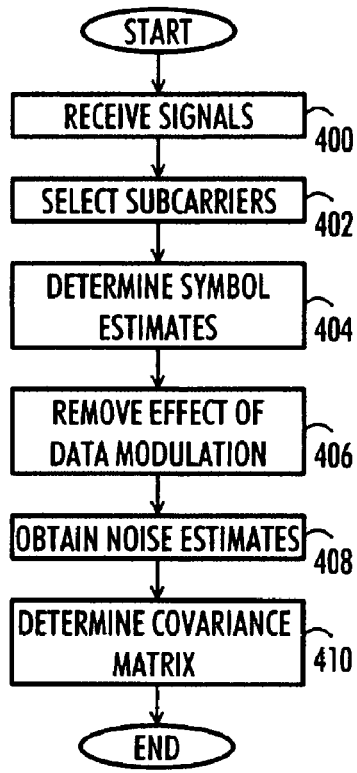
Figure 5:
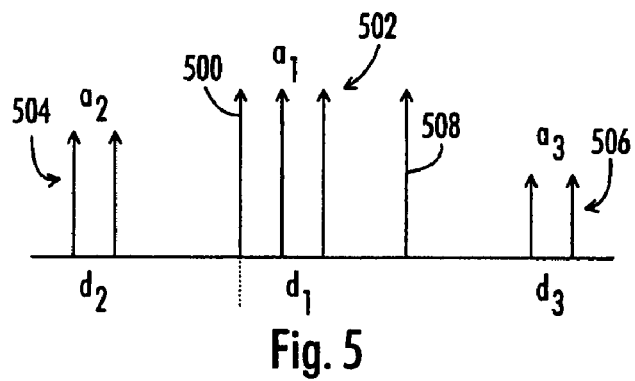
Figure 7:
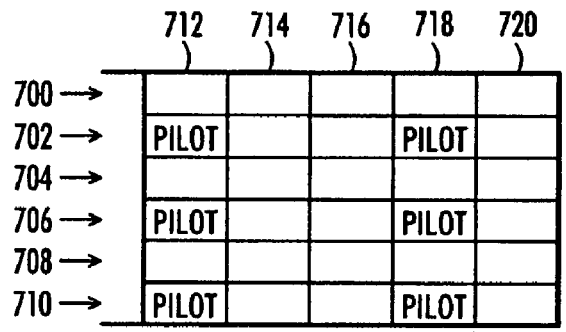
Figure 6:
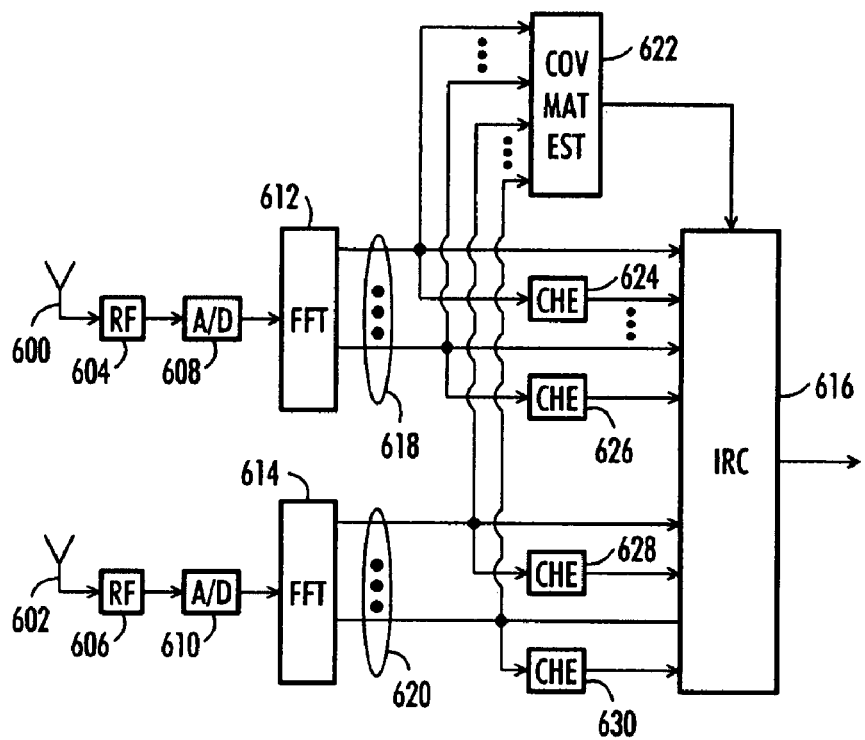

In the following, the invention will be described in greater detail with reference to the embodiments and the accompanying drawings, in which FIG. 1 illustrates an example of a telecommunication system, FIG. 2 illustrates an example of a receiver utilizing Interference Rejection Combining, FIG. 3 illustrates subcarriers of a received signal, FIG. 4 is a flowchart illustrating an embodiment of the invention, FIG. 5 illustrates an example of utilizing weight factors FIG. 6 illustrates an example of a receiver utilizing Interference Rejection Combining, and FIG. 7 illustrates an example of using subcarriers comprising pilot symbols.

DESCRIPTION OF EMBODIMENTS

With reference to FIG. 1, examine an example of a data transmission system in which embodiments of the invention can be applied. The present invention is applicable in various telecommunication systems where different multiple access methods may be used. Channels allocated to users may be frequencies, time slots or subcarriers, for example. Typical examples of a system in which the invention can be applied are GSM and GSM/EDGE based systems and evolutions of the third generation systems such as EUTRAN (sometimes called as 3.9G). In the former, a combination of TDMA and FDMA is used. In 3.9G, OFDMA is utilised. Below, embodiments of the invention are described using as an example a system where OFDMA is utilized.

FIG. 1 shows two base stations 100, 102 and five mobile stations 104, 106, 108, 110 and 112. Mobile stations 104, 106 and 108 are communicating with base station 100. Channels that are adjacent or even overlapping may be used in connections between mobile stations and different base stations. Thus, the connections may interfere with each other. For example, a channel used in the communication between mobile station 110 and base station 102 may interfere the connection between mobile station 106 and base station 100. Also other interference sources disturbing the communication may be present (not shown in FIG. 1). Therefore, efficient interference suppression is required.

In the following, a well known interference suppression algorithm known as Interference Rejection Combining (IRC) is used as an example of an application where embodiments of the invention may be utilized. Typically in 3.9G systems, Interference Rejection Combining requires that at least two antennas be used in receiving to make interference suppression efficient.

In OFDMA, the signal to be transmitted is divided into several sub-signals which are transmitted in parallel on a respective number of subcarriers. The number of subcarriers may be in tens or hundreds. The sum of the bandwidths of subcarriers equals the total bandwidth allocated for the transmission of the signal. Pilot signals may be periodically transmitted in the subcarriers to aid channel estimation in the receiver.

FIG. 2 illustrates Interference Rejection Combining in an OFDMA receiver. The receiver of FIG. 2 comprises two antennas 200, 202. In a practical receiver, the number of antennas may naturally be greater. The antennas receive a signal transmitted by one or more transmitters. The received signal is applied to radio frequency units 204, 206, which filter and amplify the signal and convert it to base band frequency. The output signals of the radio frequency units are applied to converters 208, 210 which convert the signals into digital form.

The signals are further taken to transformers 212, 214, where a Fast Fourier Transform (FFT) is performed on the signals. The signals are converted into frequency domain. The number of signals in the output of the transformers equals the number of used subcarriers. The signal 216 in the output of the first transformer 212 for the ith subcarrier may be written in the form:

$$r_{i,1} = h_{i,1} b_i + n_{i,1}$$

and the signal 218 for the ith subcarrier in the output of the second transformer 214 may be written in the form:

$$r_{i,2} = h_{i,2} b_i + n_{i,2}$$

where h represents channel, b is the received symbol and n represents noise. The total signal for a subcarrier i in vector form may be written as $$\bar{r}_i = \bar{h}_i b_i + \bar{n}_i.$$

The signals in the output of the transformers are multiplied in multipliers 220 and 224 with IRC weight factors $\bar{w}_j$ $$\bar{w}_j = \bar{C}_i^{-1} h_i,$$

where $\bar{C}_i$ is a noise covariance matrix, which in the case of two antennas is a 2×2 matrix:

$$\bar{C}_i = \begin{pmatrix} \sigma_{n,1}^2 & E[n_{i,1} n_{i,2}^*] \\ E[n_{i,2} n_{i,1}^*] & \sigma_{n,2}^2 \end{pmatrix},$$

where $\sigma_{n,1}^2 = E[n_{i,1} n^*_{i,1}]$, $\sigma_{n,2}^2 = E[n_{i,2} n^*_{i,2}]$, * denotes a complex conjugate and E[ ] represents expectation. In the case of a receiver with one antenna, the signal covariance matrix $\bar{C}_i$ is a 1×1 matrix comprising the element $\sigma_{n,1}^2$.

In an embodiment of the invention, the covariance matrix $\bar{C}_i$ is calculated using a differential method by subtracting the signals of two or more nearby subcarriers from each other after removing the effect of data modulation, which may be different in different subcarriers. Subtracting cancels data from the signals and only noise terms remain. The following formula illustrates the calculation of the covariance matrix $\bar{C}_i$:

$$\bar{C}_i = \frac{1}{2N} \sum_{j \in (J)} a_j \left( \bar{r}_j - \left( \frac{b_j}{b_{j+M_j}} \right) \bar{r}_{j+M_j} \right) \left( \bar{r}_j - \left( \frac{b_j}{b_{j+M_j}} \right) \bar{r}_{j+M_j} \right)^H,$$

where $\bar{r}_j$ and $\bar{r}_{j+M_j}$ are two nearby subcarriers, J is the set of used subcarriers, $b_j$ and $b_{j+M_j}$ are data symbols of the subcarriers, $a_j$ is a carrier pair specific coefficient, and N is the number of subcarrier pairs used in the calculation. $M_j$ is the distance of the subcarriers. When the distance $M_j=1$, the subcarriers are adjacent. The above equation is merely an example of the calculation of the covariance matrix. The term $\bar{r}_j$ may also be multiplied by $$\left(\frac{b_{j+M}}{b_j}\right),$$

for example, in which case term $\bar{r}_{j+Mj}$ does not need any multiplier. It is also possible that subcarriers in each subcarrier pair are received in different time instants i.e. they may belong to different OFDM symbol intervals. The main requirement for the subcarriers in each subcarrier pair is that the channel is sufficiently constant between the two signal samples. If this requirement is met, the applied signal samples may differ either in frequency or time, or both.

FIGS. 3 and 4 illustrate an embodiment of the invention. FIG. 3 shows a set of subcarriers. Let us assume that the covariance matrix for subcarrier 300 denoted with i is to be determined.

In step 400, signals transmitted by one or more transmitters using a multitude of subcarriers are received with one or more antennas.

In step 402, one or more subcarrier pairs 302, 304 are selected. Each subcarrier of each subcarrier pair 302, 304 is a given distance $M_j$ from each other. In this case, the distance of the subcarriers from each other $M_j$ is 1 in both pairs 302, 304. The pair 302 comprises subcarriers j1 and j1+1. The pair 304 comprises subcarriers j2 and j2+1.

In step 404, symbol estimates $b_{j1}$, $b_{j1+2}$, $b_{j2}$, and $b_{j2+1}$ for the signals of the subcarriers of the subcarrier pairs are determined. In an embodiment of the invention, such subcarriers are selected which comprise pilot symbols. The receiver knows the values of the pilot symbols. If pilot symbols are not available, estimates for the data symbols are determined by utilizing decision feedback algorithms, for example. In an embodiment, those subcarriers comprising pilot symbols that are nearest the desired subcarrier are selected as the subcarriers of the subcarrier pairs.

In step 406, the effect of data modulation is removed from the signals of the subcarriers of the subcarrier pairs. For example, if $\bar{r}_{j1+1}$ is to be subtracted from $\bar{r}_{j1}$, the signal of $\bar{r}_{j1+1}$ is multiplied by $b_{j1}/b_{j1+1}$.

In step 408, noise estimates are obtained by subtracting the signals of the subcarriers of the subcarrier pairs 302, 304 from each other. In this case the signal of $\bar{r}_{j1+1}$ is subtracted from the signal of $\bar{r}_{j1}$ and the signal of $\bar{r}_{j2+1}$ is subtracted from the signal of $\bar{r}_{j2}$.

In step 410, the noise covariance matrix for the desired subcarrier 300 is determined on the basis of the obtained noise estimates. In an embodiment, the results of the subtractions are summed and the sum is divided by the number of the subcarrier pairs. Thus, determining a noise covariance matrix for the desired channel comprises calculating an average of the obtained noise estimates.

In an embodiment of the invention, each noise estimate is weighted with a weight factor $a_j$ prior to summing. The weight factor may be based on the distance of the subcarriers or the subcarrier pairs from the desired channel or some other metric. The metric may be based, for example, on a frequency (or time-frequency) correlation function, which in general is not a linear function of distance in frequency. In the example of FIG. 3, subcarrier pair 302 is farther away from the subcarrier 300 than subcarrier pair 304. Thus, the noise estimate of pair 304 could be emphasized by selecting a greater value for $a_{j2}$ than for $a_{j1}$. If no emphasis is required, $a_j$ is equal to 1 for all pairs.

FIG. 5 illustrates an embodiment where weight factors are utilized. The desired subcarrier is denoted with 500. The covariance matrix is to be calculated using three subcarrier pairs 502, 504, 506. The distances of the subcarrier pairs from the desired are $d_1$, $d_2$ and $d_3$ where $d_1 < d_2 < d_3$. When calculating the covariance matrix for the subcarrier 500 the noise estimates of subcarrier pairs are weighted with weight factors $a_1$, $a_2$ and $a_3$ where $a_1 > a_2 > a_3$, based on subcarrier distances in frequency domain.

In an embodiment of the invention, the same set of subcarrier pairs are utilized for the determination of covariance matrix of several different subcarriers. By changing the weight factors the differences in the distances between subcarriers may be taken into account. For example, the three subcarrier pairs 502, 504, 506 may be used when determining the covariance matrix for the subcarrier 508 by adjusting the weight factors $a_1$, $a_2$ and $a_3$.

Referring again to FIG. 2, the obtained covariance matrix is utilized in the calculation of the IRC weights. For the ith subcarrier, the signals in the output of the transformers 212, 214 are multiplied in multipliers 220 and 224 by conjugated IRC weight factors $\bar{w}_j = \bar{C}_i^{-1} h_i$. The output of the multipliers are summed in adder 228. A symbol estimate $\hat{b}_i$ for the symbol of subcarrier i is in the output 232 of the adder 228.

For another subcarrier the respective operations are performed in multipliers 222 and 226 and in adder 230 having an output 234.

The embodiments of the invention may be realized both in a base station or in a mobile terminal of a telecommunication system. FIG. 5 illustrates an OFDMA receiver where an embodiment of the invention is utilized. The receiver of FIG. 6 comprises two antennas 600, 602. In a practical receiver, the number of antennas may naturally be greater. The antennas receive a signal transmitted by one or more transmitters. The received signal is applied to radio frequency units 604, 606, which filter and amplify the signal and convert it to base band frequency. The output signals of the radio frequency units are applied to converters 608, 610, which convert the signals into digital form.

The signals are further applied to transformers 612, 614, where a Fast Fourier Transform (FFT) is performed on the signals. The signals are converted into frequency domain. The number of signals in the output of the transformers equals the number of used subcarriers.

The output signals 618, 620 of the transformers 612, 614 are applied to interference rejection combiner 616 which performs interference rejection as described in association with FIG. 2. The output signals 618, 620 of the transformers are further applied to covariance matrix calculator 622, which is configured to determine covariance matrices for each subcarrier. The output signals of the transformers are further applied to calculators 624 to 630 which determine channel estimates for subcarriers. The calculated matrices and channel estimates are taken to interference rejection combiner 616.

FIG. 7 illustrates an embodiment where subcarriers comprising pilot symbols are utilized in the calculation of covariance matrix. FIG. 7 illustrates subcarriers 700, 702, 704, 706, 708 and 710. FIG. 7 shows five consecutive time slots 712, 714, 716, 718, 720 of each subcarrier. In this example, subcarriers 702, 706 and 710 comprise pilot symbols in time slots 712 and 718. These subcarriers comprising pilot symbols may be utilized when determining a covariance matrix for several subcarriers.

In an embodiment, noise estimates and the covariance matrices are determined for symbols in the time slot 712 using pilot symbols in subcarriers 702, 706, 710. As in this example pilot symbols are not transmitted in every time slot but periodically in every third time slot, interpolation may be used to determine covariance matrices. Thus, noise estimates are estimated first using pilot symbols in time slot 712 and next using pilot symbols in time slot 718. Covariance matrices for time slots 714 and 716 may be calculated by interpolating noise estimates for time slots 714 and 716 from the data provided by time slots 712 and 718. The interpolation may be linear or non linear.

Above, embodiments of the invention have been described in connection with an OFDMA receiver. In such a case, channels used in the signal transmission correspond to subcarriers. OFDMA is a typical example of a multi-carrier system. Embodiments of the invention may be applied with other multiple access systems such as TDMA, for example. In such a case channels used in the signal transmission correspond to time slots.

Embodiments of the invention may be realized as a computer program distribution medium readable by a computer and encoding a computer program of instructions for executing a computer process for receiving signals with one or more antennas, the signals having been transmitted by one or more transmitters using a multitude of channels. The encoded process comprises selecting one or more channel pairs, each channel of each channel pair being a given distance from each other, from a signal; determining symbol estimates for the signals of the channels of the channel pairs; removing the effect of data modulation from the signals of the channels of the channel pairs; obtaining noise estimates by subtracting the signals of the channels of the channel pairs from each other, and determining a noise covariance matrix for the desired channel on the basis of the obtained noise estimates.

The computer program may be stored on a computer program distribution medium readable by a computer or a processor. The computer program medium may be, for example but not limited to, an electric, magnetic, optical, infrared or semiconductor system, device or transmission medium. The computer program medium may include at least one of the following media: a computer readable medium, a program storage medium, a record medium, a computer readable memory, a random access memory, an erasable programmable read-only memory, a computer readable software distribution package, a computer readable signal, a computer readable telecommunications signal, computer readable printed matter, and a computer readable compressed software package.

Even though the invention has been described above with reference to an example according to the accompanying drawings, it is clear that the invention is not restricted thereto but it can be modified in several ways within the scope of the appended claims.

The invention claimed is:

1. A method of receiving a signal in a telecommunication system, the method comprising:
   receiving, with one or more antennas, signals transmitted by one or more transmitters using a multitude of channels;
   selecting one or more channel pairs, each channel of each channel pair being at a given distance from each other;
   determining symbol estimates for the signals of the channels of the channel pairs;
   removing an effect of data modulation from the signals of the channels of the channel pairs;
   obtaining noise estimates by subtracting the signals of the channels of the channel pairs from each other; and
   determining a noise covariance matrix for a desired channel based on the obtained noise estimates.

2. The method of claim 1, wherein the selected channels comprise a pilot signal.

3. The method of claim 1, wherein the channel pair comprises a first channel and a second channel, and the removing of the effect of data modulation from the signals of the channels comprises dividing the symbol estimate of the signal of the first channel by the symbol estimate of the signal of the second channel and subtracting the signal of the second channel multiplied by a quotient from the signal of the first channel.

4. The method of claim 1, wherein the determining of the noise covariance matrix for the desired channel comprises calculating an average of the obtained noise estimates.

5. The method of claim 4, wherein each noise estimate is weighted based on the distance of the channels of respective channel pair from the desired channel.

6. The method of claim 1, wherein the channels are subcarriers of an OFDMA or OFDM transmission.

7. The method of claim 1, wherein the channels are time slots of a TDMA transmission.

8. The method of claim 1, further comprising:
   selecting nearest channels comprising a pilot signal as the channels of the channel pairs.

9. The method of claim 1, further comprising:
   utilizing the noise covariance matrix in interference rejection combining.

10. The method of claim 1, further comprising:
    utilizing the noise covariance matrix in a maximum a posteriori probability receiver.

11. The method of claim 1, further comprising:
    utilizing the noise covariance matrix in a maximum likelihood receiver.

12. The method of claim 1, further comprising:
    utilizing the noise covariance matrix in a maximal-ratio combining receiver.

13. A receiver of a telecommunication system, comprising:
    one or more antennas;
    a radio frequency unit connected to the antennas and configured to receive signals transmitted by one or more transmitters using a multitude of channels; and
    an estimator configured to
      select one or more channel pairs, each channel of each channel pair being at a given distance from each other,
      determine symbol estimates for the signals of the channels of the channel pairs,
      remove an effect of data modulation from the signals of the channels of the channel pairs,
      obtain noise estimates by subtracting the signals of the channels of the channel pairs from each other, and
      determine a noise covariance matrix for a desired channel based on the obtained noise estimates.

14. The receiver of claim 13, wherein the channel pair comprises a first channel and a second channel, and the estimator is further configured to divide the symbol estimate of the signal of the first channel by the symbol estimate of the signal of the second channel and subtract the signal of the second channel multiplied by the quotient from the signal of the first channel.

15. The receiver of claim 13, wherein the estimator is further configured to calculate an average of the obtained noise estimates when determining the noise covariance matrix for the desired channel.

16. The receiver of claim 15, wherein the estimator is further configured to weight each noise estimate based on the distance of the channels of respective channel pair from the desired channel.

17. The receiver of claim 13, wherein the estimator is further configured to select the nearest channels comprising a pilot signal as channels of the channel pairs.

18. The receiver of claim 13, wherein the receiver is configured to receive OFDMA transmission where the channels are subcarriers of the OFDMA transmission.

19. The receiver of claim 13, wherein the receiver is configured to receive TDMA transmission where the channels are time slots of the TDMA transmission.

20. The receiver of claim 13, further comprising:
an interference rejection combiner configured to utilize the noise covariance matrix in an interference rejection.

21. A receiver of a telecommunication system, comprising:
one or more antennas;
means for receiving signals transmitted by one or more transmitters using a multitude of channels;
means for selecting one or more channel pairs, each channel of each channel pair being a given distance from each other;
means for determining symbol estimates for the signals of the channels of the channel pairs;
means for removing the effect of data modulation from the signals of the channels of the channel pairs;
means for obtaining noise estimates by subtracting the signals of the channels of the channel pairs from each other; and
means for determining a noise covariance matrix for a desired channel based on the obtained noise estimates.

22. The receiver of claim 21, wherein the selected channel pair comprises a first channel and a second channel, and the receiver comprises means for dividing the symbol estimate of the signal of the first channel by the symbol estimate of the signal of the second channel and subtracting the signal of the second channel multiplied by a quotient from the signal of the first channel.

23. A computer program distribution medium readable by a computer and encoding a computer program of instructions for executing a computer process for receiving signals with one or more antennas, the signals having been transmitted by one or more transmitters using a multitude of channels, the process comprising:
selecting one or more channel pairs, each channel of each channel pair being at a given distance from each other;
determining symbol estimates for the signals of the channels of the channel pairs;
removing an effect of data modulation from the signals of the channels of the channel pairs;
obtaining noise estimates by subtracting the signals of the channels of the channel pairs from each other; and
determining a noise covariance matrix for a desired channel based on the obtained noise estimates.

24. The computer program distribution medium of claim 23, the distribution medium including at least one of the following media: a computer readable medium, a program storage medium, a record medium, a computer readable memory, a computer readable software distribution package, a computer readable signal, a computer readable telecommunications signal, and a computer readable compressed software package.

\* \* \* \* \*